(12) United States Patent
Sadamitsu

(10) Patent No.: US 7,445,822 B2
(45) Date of Patent: Nov. 4, 2008

(54) AZO COMPOUNDS AND DYE-TYPE POLARIZING FILMS OR PLATES CONTAINING THE SAME

(75) Inventor: Yuichi Sadamitsu, Tokyo (JP)

(73) Assignees: Nippon Kayaku Kabushiki Kaisha, Tokyo (JP); Polatechno Co., Ltd., Niigata (JP)

(*) Notice: Subject to any disclaimer, the term of this patent is extended or adjusted under 35 U.S.C. 154(b) by 0 days.

(21) Appl. No.: 11/666,703

(22) PCT Filed: Nov. 21, 2005

(86) PCT No.: PCT/JP2005/021355

§ 371 (c)(1),
(2), (4) Date: Apr. 30, 2007

(87) PCT Pub. No.: WO2006/057214

PCT Pub. Date: Jun. 1, 2006

(65) Prior Publication Data

US 2008/0094549 A1    Apr. 24, 2008

(30) Foreign Application Priority Data

Nov. 24, 2004    (JP) .............................. 2004-338876

(51) Int. Cl.
G02B 5/30    (2006.01)
C08B 31/22    (2006.01)

(52) U.S. Cl. ...................... 428/1.31; 534/678; 534/679; 534/680

(58) Field of Classification Search ................ 428/1.31; 534/678, 679, 680
See application file for complete search history.

(56) References Cited

U.S. PATENT DOCUMENTS 5,318,856 A    6/1994    Misawa et al. ............... 428/524
6,790,490 B1    9/2004    Oiso et al. .................. 428/1.31

FOREIGN PATENT DOCUMENTS

| EP | 0 549 342 | 6/1993 |
|---|---|---|
| EP | 1 712 595 | 10/2006 |
| JP | 59-145255 | 8/1984 |
| JP | 60-156759 | 9/1985 |
| JP | 03078703 | * 4/1991 |
| JP | 5-295281 | 11/1993 |
| JP | 2622748 | 4/1997 |
| JP | 10-259311 | 9/1998 |
| JP | 11-218610 | 8/1999 |
| JP | 11-218611 | 8/1999 |
| JP | 2001-33627 | 2/2001 |
| JP | 2002-105348 | 4/2002 |
| JP | 2002-275381 | 9/2002 |
| JP | 2002-296417 | 10/2002 |
| JP | 2004-137452 | 5/2004 |
| WO | 01/06281 | 1/2001 |

OTHER PUBLICATIONS

The International Search Report dated Feb. 21, 2006.
The International Search Report dated Mar. 8, 2005.

* cited by examiner

Primary Examiner—Shean C Wu
(74) Attorney, Agent, or Firm—Nields & Lemack

(57) ABSTRACT

Azo compounds whose free acid forms are represented by the general formula (1) are extremely useful as the dichroic dye to be used in polarizing plates which are excellent in polarization performance and endurance and reduced in the color cross-talk within the visible light region or in polarizers for liquid crystal projectors made by using them; (1) wherein R1 is sulfo, carboxy, or lower alkoxy and R2 is sulfo, carboxy, lower alkyl, or lower alkoxy, with the proviso that a case wherein both R1 and R2 are each sulfo is excepted; R3 to R6 are each independently hydrogen, lower alkyl, or lower alkoxy; and R7 and R8 are each independently hydrogen, amino, hydroxy, sulfo, or carboxy.

11 Claims, No Drawings

AZO COMPOUNDS AND DYE-TYPE POLARIZING FILMS OR PLATES CONTAINING THE SAME

TECHNICAL FIELD

The present invention relates to an azo compound and a novel dye-type polarizing film or polarizing plate containing the same.

BACKGROUND ART

As well as liquid crystals having light switching function, polarizing plates having light transmitting and screening functions are basic constitutive elements of display devices such as liquid crystal displays (LCD). The fields of application of the LCD expand from small devices such as electronic calculators and watches in the early days to a wide variety of the fields such as notebook type personal computers, word processors, liquid crystal projectors, liquid crystal televisions, car navigations, and outdoor and indoor instruments, and they are used under wide conditions of low temperature to high temperature, low humidity to high humidity and low light volume to high light volume. Therefore, polarizing plates high in polarizing performance and excellent in endurance are demanded.

At present, a polarizing film is produced in the following manner. A substrate of polarizing film such as a stretched and orientated film of polyvinyl alcohol or a derivative thereof or a polyene type film obtained by dehydrochlorinating a polyvinyl chloride film or dehydrating a polyvinyl alcohol film to produce polyene, followed by orientation, is dyed or incorporated with iodine or a dichroic dye as a polarizer, thereby obtaining a polarizing film. Of these polarizing films, iodine-type polarizing films which use iodine as a polarizer are superior in initial polarizing performance, but weak against water and heat, and have a problem in endurance in case they are used for a long period of time in the state of high temperature and high humidity. In order to improve the endurance, it is proposed to treat the films with formalin or an aqueous solution containing boric acid or to use a polymeric film of low moisture permeability as a protective film, but the improvement attained by these methods is generally not sufficient. On the other hand, the dye-type polarizing films which use dichromatic dyes as polarizer are superior in moisture resistance and heat resistance to the iodine-type polarizing films, but are generally insufficient in initial polarizing performance.

In the case of a polarizing film of neutral color made by adsorbing several kinds of dichroic dyes to a polymeric film and orientating the film, if there occurs leakage of light of a specific wavelength in the visible light region (color leakage) in such a state that two pieces of polarizing films are superposed one upon another in such a manner that the orientation directions cross at right angles (crossed nicols state) and in this state, when these polarizing films are fitted to a liquid crystal panel, hue of the liquid crystal display sometimes changes in dark state. In order to inhibit change in color of liquid crystal display caused by color leakage of a specific wavelength in dark state when the polarizing films are fitted to a liquid crystal display device, it is necessary to uniformly reduce the transmittance at the crossed nicols state (transmittance at crossed nicols state) in wavelength region of the visible light region in the polarizing films of neutral color made by adsorbing several kinds of dichroic dyes to a polymeric film and orientating the film.

In the case of a color liquid crystal projection type display, namely, a color liquid crystal projector, a polarizing plate is used in the liquid crystal image forming part, and hitherto an iodine-type polarizing plate which is satisfactory in polarizing performance and shows neutral grey has been used. However, as mentioned above, the iodine-type polarizing plate suffers from the problems that it is insufficient in light resistance, heat resistance and moist heat resistance because iodine is used as a polarizer. For solving these problems, polarizing plates of neutral grey using dichroic dyestuffs as the polarizer are used, but in the case of polarizing plates of neutral grey, for averagely improving transmittance and polarizing performance in the whole visible light wavelength region, generally dyestuffs of three primary colors are used in combination. Therefore, there are problems that the light transmittance is low for satisfying the demand of market to make brighter the color liquid crystal projectors, and thus, for making brighter, the intensity of light source must be further enhanced. In order to solve the problems, three polarizing plates corresponding to three primary colors, namely, for blue color channel, green color channel and red color channel, have been used.

However, since the light is highly absorbed by the polarizing plate and images of small area of 0.9-6 inches are enlarged to about several ten inches to one hundred and several ten inches, reduction of brightness is unavoidable, and hence a light source of high luminance is used. In addition, demand for further improvement in brightness of liquid crystal projector is strong, and, as a result, the intensity of light source used is naturally further enhanced, thereby resulting in increase of light and heat applied to the polarizing plate.

As the dyes used for production of the above-mentioned dye-type polarizing films, mention may be made of water-soluble azo compounds disclosed, for example, in the following Patent Document 1 to Patent Document 8.

However, the conventional polarizing plates containing the water-soluble dyes do not sufficiently satisfy the needs of market from the viewpoints of polarization characteristics, absorption wavelength region, hue, etc. Furthermore, the three polarizing plates corresponding to three primary colors, namely, for blue color channel, green color channel and red color channel in color liquid crystal projectors are not satisfactory in all of brightness, polarizing performance, endurance under high temperature and high humidity conditions and light resistance in long-term exposure, and hence improvement in these points have been desired.

Patent Document 1: JP-A-2001-33627
Patent Document 2: JP-A-2004-137452
Patent Document 3: JP-A-11-218611
Patent Document 4: JP-A-2002-296417
Patent Document 5: JP-A-2002-275381
Patent Document 6: Patent No. 2622748
Patent Document 7: JP-A-05-295281
Patent Document 8: JP-A-60-156759

DISCLOSURE OF INVENTION

Problem to be Solved by the Invention

One of the objects of the present invention is to provide a polarizing film and polarizing plate of high performance having excellent polarizing performance and moisture resistance, heat resistance and light resistance. Another object of the present invention is to provide a polarizing film and polarizing plate of high performance having excellent polarizing performance and moisture resistance, heat resistance and light resistance, said polarizing film and polarizing plate being of neutral color, being obtained by adsorbing two or more dichroic dyes to a polymeric film and orientating the film, and being free from color leakage in the crossed nicols state in the wavelength region of visible light.

Further object of the present invention is to provide a polarizing film and polarizing plate of high performance which has brightness corresponding to the three primary colors of color liquid crystal projector, and is satisfactory in all of polarizing performance, endurance and light resistance.

Further object is to provide a novel azo compound which enables to provide the polarizing film and polarizing plate having excellent characteristics as mentioned above.

Means for Solving the Problem

As a result of intensive research conducted by the inventors in an attempt to attain the above objects, it has been found that a polarizing film and polarizing plate containing a specific dye have excellent polarizing performance and moisture resistance, heat resistance and light resistance. Thus, the present invention has been accomplished.

That is, the present invention relates to an azo compound represented by the following formula (1) in the form of a free acid:

Moreover, in the present invention, the polarizing film or polarizing plate is preferably for liquid crystal projectors.

Advantages of the Invention

The azo compound of the present invention is useful as a dye for polarizing films. The polarizing films or polarizing plates containing this compound have a high polarizing performance comparable to that of polarizing films which use iodine, and are excellent also in endurance and are suitable for uses in various liquid crystal display devices and liquid crystal projectors, uses in vehicles which need high polarizing performance and endurance, and display uses of industrial instruments used in various environments.

BEST MODE FOR CARRYING OUT THE INVENTION

The lower alkyl group in the present invention is preferably a lower alkyl group of 1-4 carbon atoms such as methyl, ethyl, propyl, butyl or the like. The lower alkoxyl group in the present invention is preferably a lower alkoxyl group of 1-4 carbon atoms such as methoxy, ethoxy, propoxy, butoxy, or the like.

[Formula 1]

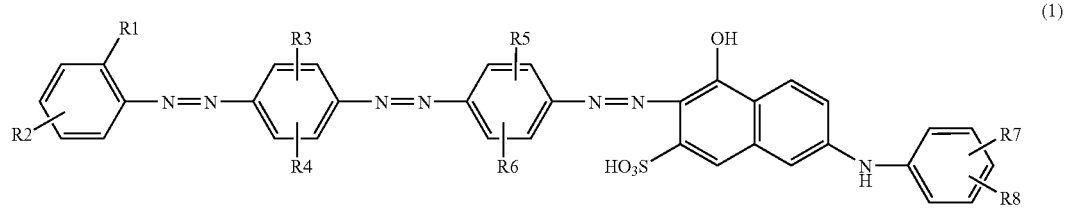

(1)

[in the above formula, R1 represents a sulfo group, a carboxyl group or a lower alkoxyl group, R2 represents a sulfo group, a carboxyl group, a lower alkyl group or a lower alkoxyl group, with the proviso that a case where both R1 and R2 represent sulfo group is excepted, R3 to R6 each independently represents a hydrogen atom, a lower alkyl group or a lower alkoxyl group, and R7 and R8 each independently represents a hydrogen atom, an amino group, a hydroxyl group, a sulfo group or a carboxyl group].

The azo compounds of the present invention are preferably those of the formula (1) where R1 is a sulfo group and R2 is a lower alkyl group or a lower alkoxyl group.

Furthermore, those azo compounds where R1 is a carboxyl group or a lower alkoxyl group and R2 is a sulfo group or a carboxyl group are preferred.

The present invention further relates to a dye-type polarizing film or polarizing plate containing the above azo compound or a salt thereof in a substrate of the polarizing film.

The present invention further relates to a dye-type polarizing film or polarizing plate containing the above azo compound or a salt thereof and one or more other organic dyes in a substrate of the polarizing film.

In the present invention, it is preferred that the substrate of the polarizing film is a film comprising a polyvinyl alcohol-based resin.

The azo compound of the present invention is a compound represented by the formula (1) in the form of a free acid. In the formula (1), R1 represents a sulfo group, a carboxyl group, a lower alkoxyl group, and R2 represents a sulfo group, a carboxyl group, a lower alkyl group or a lower alkoxyl group. It is preferred that R1 is a sulfo group and R2 is a lower alkyl group or a lower alkoxyl group, or R1 is a carboxyl group or a lower alkoxyl group and R2 is a sulfo group or a carboxyl group. The bonding position of R2 is preferably para position or meta position in respect to the azo group, and is especially preferably the para position. R3-R6 each independently represents a hydrogen atom, a lower alkyl group or a lower alkoxyl group, and preferably a hydrogen atom, a methyl group or methoxy group. It is especially preferred that R3 is a hydrogen atom or a methyl group, R4 is a methyl group or a methoxy group, and R5-R6 are methyl group. R7 and R8 represent a hydrogen atom, an amino group, a hydroxyl group, a sulfo group or a carboxyl group, and preferably a hydrogen atom, an amino group or a sulfo group. Especially preferably, R7 and R8 both represent hydrogen atom.

Examples of the azo compounds represented by the formula (1) are shown below. In the following formulas, the sulfo group, carboxyl group and hydroxyl group are shown in the form of a free acid.

[Formula 2]
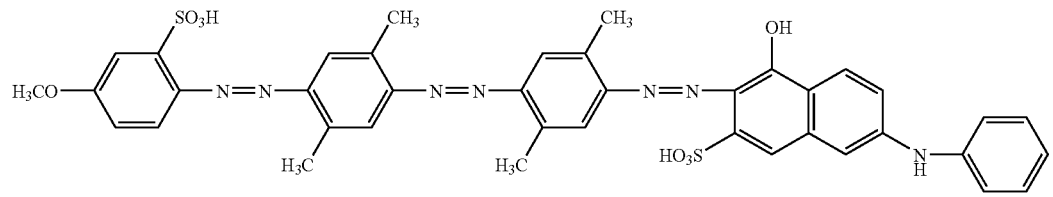
(2)
[Formula 3]
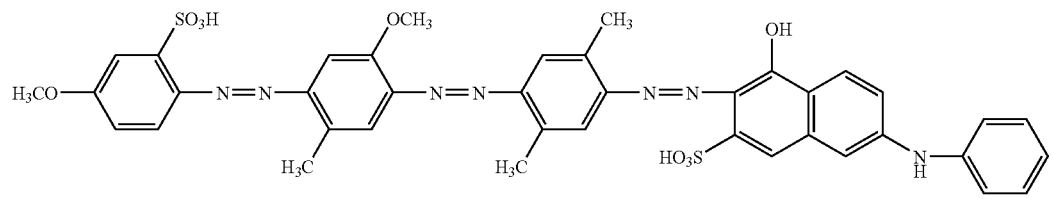
(3)
[Formula 4]
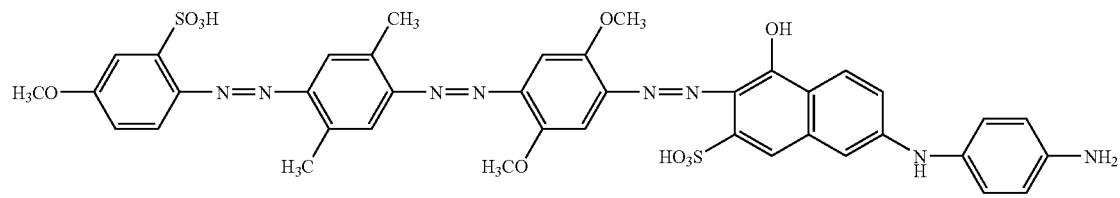
(4)
[Formula 5]
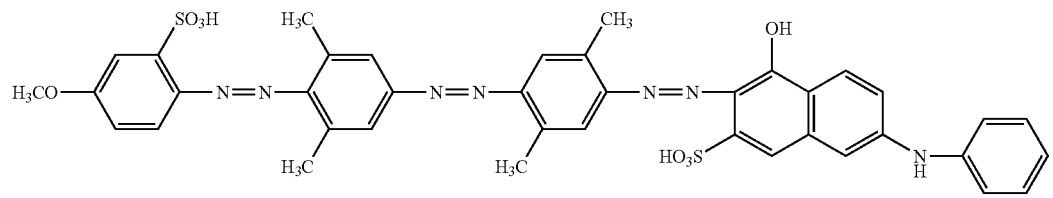
(5)
[Formula 6]
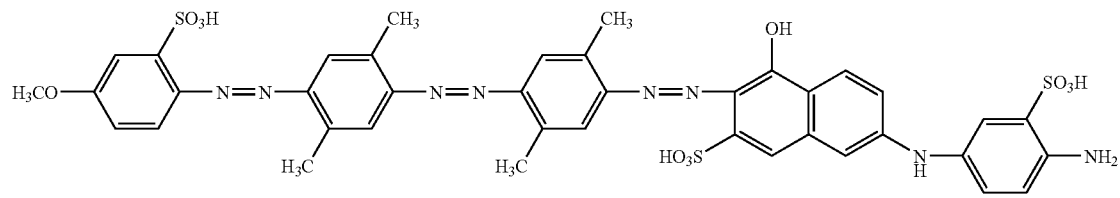
(6)
[Formula 7]
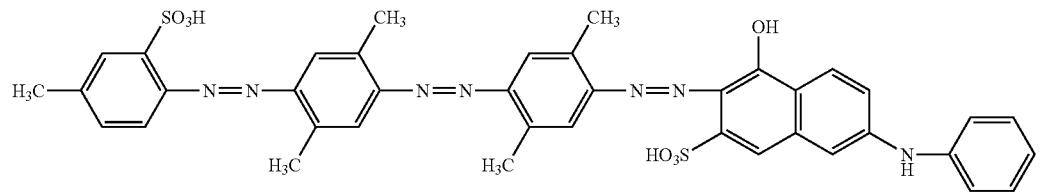
(7)
[Formula 8]
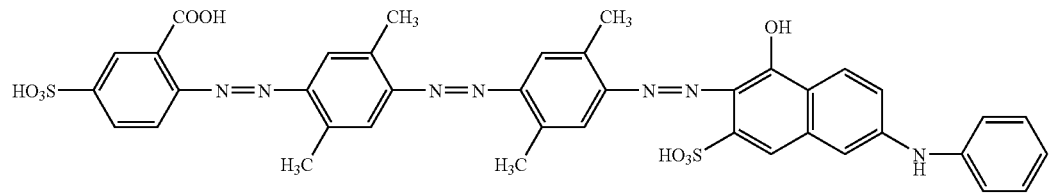
(8)
[Formula 9]
(9)

The azo compound of the present invention represented by the formula (1) in the form of a free acid may be in the from of a salt. As the salt, mention may be made of, for example, alkali metal salts such as lithium salt, sodium salt and potassium salt, ammonium salts, and organic amine salts such as ethanolamine.

The azo compound represented by the formula (1) in the form of a free acid can be easily prepared by carrying out known diazotization and coupling in accordance with a usual process for preparation of azo dyes. A specific example of preparation is shown below. An aniline represented by the following formula (A) is diazotized, followed by carrying out a coupling with an aniline represented by the following formula (B) to obtain a monoazoamino compound represented by the following formula (C).

[Formula 11]

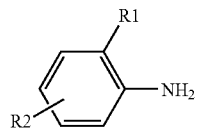
(A)

(in the above formula, R1 and R2 have the same meanings as in the formula (1))

[Formula 12]

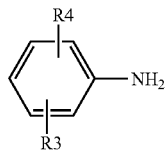
(B)

(in the above formula, R3 and R4 have the same meanings as in the formula (1))

[Formula 13]

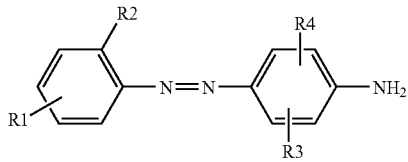
(C)

Then, the resulting monoazoamino compound is diazotized, followed by carrying out a second coupling with an aniline represented by the following formula (D) to obtain a disazoamino compound represented by the following formula (E).

[Formula 14]

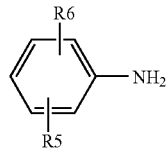
(D)

(in the above formula, R5 and R6 have the same meanings as in the formula (1))

[Formula 15]

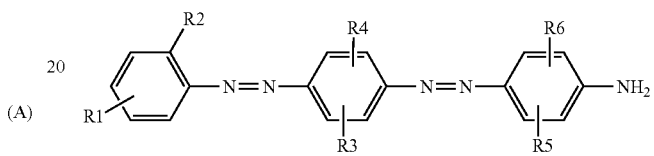
(E)

The resulting disazoamino compound is diazotized, followed by carrying out a third coupling with a naphthol represented by the following formula (F) to obtain the azo compound of the formula (1).

[Formula 16]

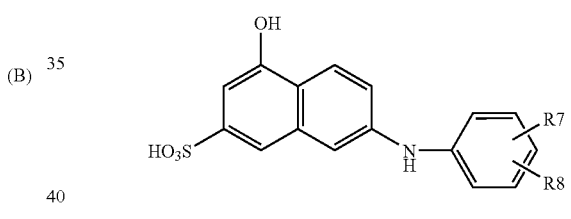
(F)

(in the above formula, R7 has the same meaning as in the formula (1)).

The diazotizing step in the above reaction is carried out by a sequential method of adding a nitrite such as sodium nitrite to an aqueous solution or suspension of the diazo component in a mineral acid such as hydrochloric acid or sulfuric acid or a reverse method of adding a nitrite to a neutral or weakly alkaline aqueous solution of the diazo component and then mixing the solution with a mineral acid. The diazotizing temperature is suitably $-10°$ C. to $40°$ C. The coupling step with aniline is carried out by mixing an acidic aqueous solution of hydrochloric acid or acetic acid with each of the above diazotized solution and carrying out the coupling at a temperature of $-10°$ C. to $40°$ C. under an acidic condition of pH 2-7.

The monoazo compound and disazo compound obtained by the coupling are isolated as they are or by separating the compound by acid precipitation or salting-out, and then filtering off the compound. Alternatively, the step may proceed to the next step with the compounds being in the state of solution or suspension. In case the diazonium salt is hardly soluble and is in the state of suspension, the suspension can be filtered to obtain a press cake, which is used at the next step.

The third coupling reaction of the diazotized product of the disazoamino compound with the naphthol represented by the formula (F) is carried out at a temperature of −10° C. to 40° C. under a neutral to alkaline condition of pH 7-10. After completion of the reaction, the objective product is precipitated by salting-out and isolated by filtration. If purification is necessary, it can be performed by repeating the salting-out or precipitating the objective product from water using an organic solvent. The organic solvent used for the purification includes water-soluble organic solvents, for example, alcohols such as methanol and ethanol, and ketones such as acetone.

As the aniline represented by the formula (A) which has substituents (R1, R2) and which is a starting material used for synthesis of the water-soluble dye represented by the formula (1), mention may be made of, for example, 2-amino-5-methylbenzenesulfonic acid, 2-amino-5-methoxybenzenesulfonic acid, 3-amino-4-methoxybenzenesulfonic acid, 2-amino-4-sulfobenzoic acid, and 2-amino-5-sulfobenzoic acid. Of these anilines, 2-amino-5-methylbenzenesulfonic acid, 2-amino-5-methoxybenzenesulfonic acid and 2-amino-4-sulfobenzoic acid are preferred.

Examples of the substituents in the anilines represented by the formula (B) or (D) which may have substituents (R3, R4 or R5, R6) and are the first and second coupling components are methyl, ethyl group, methoxy, ethoxy, etc. The number of these substituents may be one or two. As for the bonding position of the substituents, it is preferably 2-position or 3-position, 2-position and 5-position, 3-position and 5-position or 2-position and 6-position in respect to the amino group, and it is especially preferably 3-position, and 2-position and 5-position. The anilines include, for example, aniline, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline, 3,5-dimethylaniline, 2,6-dimethylaniline, 3,5-dimethoxyaniline, etc. In these anilines, the amino group may be protected.

The protecting groups include, for example, ω-methanesulfonic acid group. The anilines used for the first coupling and those used for the second coupling may be the same or different.

The naphthols represented by the formula (F) which are the third coupling components include, for example, 6-phenylamino-3-sulfonic acid-1-naphthol, 6-(4'-aminophenyl)amino-3-sulfonic acid-1-naphthol, 6-(4'-hydroxyphenyl)amino-3-sulfonic acid-1-naphthol, 6-(4'-amino-3'-sulfophenyl)amino-3-sulfonic acid-1-naphthol, etc.

In the polarizing film or polarizing plate of the present invention, the azo compound represented by the formula (1) or a salt thereof is singly used, and, in addition, if necessary, one or more of other organic dyes may be used in combination. The organic dyes are not particularly limited, and are preferably those which have absorption characteristics in a wavelength region different from the absorption wavelength region of the azo compound of the present invention or a salt thereof and which are high in dichroism. Examples of these organic dyes are C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81, C.I. Direct Red 247, C.I. Direct Green 80, C.I. Direct Green 59, and the dyes disclosed in Patent Document 1, 4 and 6. These dyestuffs are used as free acids, or alkali metal salts (e.g., Na salts, K salts and Li salts), ammonium salts, and salts of amines.

If the other organic dyes are used in combination, the kind of the dyes added varies depending on the objective polarizing films, namely, depending on whether they are polarizing films of neutral color, color polarizing films for liquid crystal projectors, or other color polarizing films. The amount of the dyes added is not particularly limited, and generally it is preferred to use one or more of the organic dyes in an amount of usually 0.1-10 parts by weight in total based on the weight of the azo compound of the formula (1) or a salt thereof.

The polarizing film of the present invention or the polarizing film of the present invention used in polarizing plates for liquid crystal projectors which has various hues and neutral color can be produced by incorporating the azo compound represented by the formula (1) or a salt thereof, if necessary, together with other organic dyes into a polymeric film which is a material of the polarizing film by a known method. The resulting polarizing films are provided with a protective film and can be used as polarizing plates, if necessary, provided with a protective layer or an AR (anti-reflection) layer, and a support or the like. These polarizing plates can be used for liquid crystal projectors, electronic calculators, watches, notebook type personal computers, word processors, liquid crystal televisions, car navigations, outdoor and indoor instruments or displays, etc.

The substrate (polymeric film) used for the polarizing film of the present invention preferably comprises a polyvinyl alcohol-based substrate, and examples of the polyvinyl alcohol-based substrate are polyvinyl alcohol or derivatives thereof or these polyvinyl alcohol or derivatives thereof which are modified with olefins such as ethylene and propylene or unsaturated carboxylic acids such as crotonic acid, acrylic acid, methacrylic acid and maleic acid. Among them, films comprising polyvinyl alcohol or derivatives thereof are suitable from the points of dye adsorption and orientation. The thickness of the substrate is usually about 30-100 μm, preferably about 60-90 μm.

The azo compound of the formula (1) or a salt thereof can usually be contained in the polymeric film by a method of dyeing the polymeric film. The dyeing is carried out, for example, in the following manner. First, the compound of the present invention and, if necessary, other organic dyes are dissolved in water to prepare a dye bath. The concentration of the dye in the dye bath is not particularly limited, and is selected usually from the range of about 0.001-10% by weight. If necessary, a dyeing assistant may be used, and, for example, it is suitable to use Glauber's salt in a concentration of usually about 0.1-10% by weight. The polymeric film is dyed by dipping it in the thus prepared dye bath for usually 1-10 minutes. The dyeing temperature is preferably about 40-80° C.

Orientation of the water-soluble dye is carried out by stretching the polymeric film dyed as mentioned above. As the stretching method, there may be employed any known methods such as wet method and dry method. The stretching of the polymeric film may be carried out before dyeing, if necessary. In this case, orientation of the water-soluble dye is performed at the time of the dyeing. If necessary, the polymeric film in which the water-soluble dye is contained and orientated is subjected to an after-treatment such as boric acid treatment by a known method. This after-treatment is carried out for the purpose of improving the light transmittance and polarization degree of the polarizing film. Regarding the conditions of the boric acid treatment which vary depending on the kind of the polymeric film used and the kind of the dye used, generally the treatment is carried out by dipping the polymeric film in an aqueous boric acid solution having a boric acid concentration of 0.1-15% by weight, preferably 1-10% by weight at a temperature of usually 30-80° C., preferably 40-75° C. for usually 0.5-10 minutes. Furthermore, if necessary, a fixing treatment with an aqueous solution containing a cationic polymeric compound may be carried out in combination.

A polarizing plate can be made by laminating a protective film excellent in optical transparency and mechanical strength on one or both sides of the thus obtained dye-type polarizing film of the present invention. As materials constituting the protective film, there may be used, for example, cellulose acetate films, acrylic films, fluorine-based films such as ethylene tetrafluoride/propylene hexafluoride copolymers, and films comprising polyester resin, polyolefin resin or polyamide resin. The thickness of the protective film is usually 40-200 μm.

As adhesives used for lamination of the polarizing film and the protective film, mention may be made of, for example, polyvinyl alcohol adhesives, urethane emulsion adhesives, acrylic adhesives, and polyester-isocyanate adhesives, and the polyvinyl alcohol adhesives are suitable.

A transparent protective layer may further be provided on the surface of the polarizing plate of the present invention. The protective layer includes, for example, an acrylic or polysiloxane hard coat layer, a urethane protective layer or the like. In order to further improve single plate light transmittance, it is preferred to provide an AR layer on the protective layer. The AR layer can be formed, for example, by vapor deposition or sputtering of a material such as silicon dioxide or titanium oxide, or by thinly coating a fluorine-based material. The polarizing plate of the present invention can also be used as an elliptic polarizing plate made by laminating a phase difference plate.

The polarizing plate of the present invention made as mentioned above has neutral color and has the characteristics that it shows no color leakage at the crossed nicols state in the wavelength region of the visible light region, is excellent in polarizing performance, shows no change of color or deterioration of polarizing performance even in the state of high temperature and high humidity, and is less in light leakage at the crossed nicols state in the visible light region.

The polarizing plate for liquid crystal projectors in the present invention contains the azo compound represented by the formula (1) or a salt thereof as a dichroic molecule and, if necessary, additionally contains the above-mentioned other organic dyes. The polarizing film used in the polarizing plate for liquid crystal projectors in the present invention is also produced by the method explained above with reference to the production of the polarizing film of the present invention, and a protective film is provided thereon to make a polarizing plate, and, if necessary, a protective layer or an AR layer and a support are provided to make a polarizing plate for liquid crystal projectors.

As polarizing plate for liquid crystal projectors, preferably the single plate average light transmittance is 39% or higher and the average light transmittance at the crossed nicols state is 0.4% or lower, and more preferably the single plate average light transmittance is 41% or higher and the average light transmittance at the crossed nicols state is 0.3% or lower, more preferably 0.2% or lower, in the wavelength regions necessary for the polarizing plate (420-500 nm for blue color channel, 500-580 nm for green color channel, 600-680 nm for red color channel). Further preferably, the single plate average light transmittance is 42% or higher and the average light transmittance at the crossed nicols state is 0.1% or lower in the wavelength regions necessary for the polarizing plate. The color polarizing plate for liquid crystal projectors of the present invention has brightness and excellent polarizing performance as mentioned above.

The polarizing plate for liquid crystal projectors of the present invention is preferably a polarizing plate with AR layer which is made by providing an AR layer on a polarizing plate comprising a polarizing film and a protective film, and more preferably a polarizing plate with AR layer and support which is made by laminating the above polarizing plate on a support such as a transparent glass plate.

The single plate average light transmittance is an average value of light transmittances in a specific wavelength region when a natural light is incident on one piece of polarizing plate provided with neither AR layer nor support such as transparent glass plate (hereinafter the single term "polarizing plate" means the polarizing plate with neither AR layer nor support). The average light transmittance at the crossed nicols state is an average value of light transmittances in a specific wavelength region when a natural light is incident on two pieces of polarizing plates disposed with the orientation directions crossing at right angles.

The polarizing plate for liquid crystal projectors of the present invention is generally used as a polarizing plate with support. The support is preferably one which has a flat part because the polarizing plate is laminated on the support, and is preferably a glass molded article because the polarizing plate is for optical use. Examples of the glass molded articles are glass plates, lenses, prisms (e.g., triangular prisms, cubic prisms), etc. A lens on which the polarizing plate is laminated can be utilized as a condenser lens with polarizing plate in the liquid crystal projector. A prism on which the polarizing plate is laminated can be utilized as a polarizing beam splitter with polarizing plate or as a dichroic prism with polarizing plate in the liquid crystal projector. Furthermore, the polarizing plate may be laminated on a liquid crystal cell. As materials of the glass, mention may be made of, for example, inorganic glasses such as soda glass, borosilicate glass and sapphire glass and organic glasses such as acrylic glass and polycarbonate glass, and the inorganic glasses are preferred. The thickness and size of the glass plate may be optionally selected. In the case of the polarizing plate with glass, it is preferred to provide an AR layer on one or both of the glass surface and the polarizing plate surface for further improvement of the single plate light transmittance.

The polarizing plate with support for liquid crystal projector is produced by the method known per se, for example, by coating a transparent adhesive (tackifier) on the flat part of the support and then laminating the polarizing plate of the present invention on the coated surface. Furthermore, it may also be produced by coating a transparent adhesive (tackifier) on the polarizing plate and then laminating the support on the coated surface. The adhesive (tackifier) used here is preferably of acrylate ester type. In the case of using this polarizing plate as an elliptical polarizing plate, usually the phase difference plate side is laminated on the support side, but the polarizing plate side may be laminated on the glass molded article.

That is, in the color liquid crystal projector using the polarizing plate of the present invention, in the case of green color channel part, the polarizing plate of the present invention is disposed on one or both of light incoming side and light outgoing side of a liquid crystal cell. The polarizing plate may or may not contact with the liquid crystal cell, but preferably it does not contact with the liquid crystal cell from the viewpoint of endurance. In a system where a PBS (polarizing beam splitter) is used behind the light source, an iodine-type polarizing plate or the polarizing plate of the present invention may be used as the polarizing plate on the light incoming side. When the polarizing plate contacts with the liquid crystal cell on the light outgoing side, there may be used the polarizing plate of the present invention which uses the liquid crystal cell as a support. When the polarizing plate does not contact with the liquid crystal cell, it is preferred to use the polarizing plate of the present invention which uses a support other than the liquid crystal cell. From the viewpoint of endurance, preferably the polarizing plate of the present invention is disposed on both the light incoming side and the light outgoing side of the liquid crystal cell, and more preferably the polarizing plate is disposed in such a manner that the side of the polarizing plate faces the liquid crystal cell and the side of the support faces the light source. The light incoming side of the liquid crystal cell means the side of light source and the opposite side is called light outgoing side.

In the color liquid crystal projector using the polarizing plate of the present invention, it is preferred to dispose an ultraviolet-cutting filter between the light source and the above polarizing plate with support which is disposed on the light incoming side. The liquid crystal cell used is preferably one which is, for example, active matrix type formed by interposing a liquid crystal between a transparent substrate on which an electrode and a thin film transistor (TFT) are formed and a transparent substrate on which a counter electrode is formed. A light emitted from a light source such as a metal halide lamp passes through the ultraviolet-cutting filter and is separated into three primary colors, and thereafter they pass through color polarizing plates with support for the respective channels of blue color, green color and red color, then are combined, enlarged by a projection lens, and projected on a screen.

The polarizing plate for color liquid crystal projector constructed as above has features that it is excellent in polarizing performance, and shows neither change of color nor deterioration of polarizing performance even in the state of high temperature and high humidity.

The present invention will be explained in more detail by the following examples, which are exemplary only and should not be construed as limiting the invention in any manner. All "%" and "part" in the examples are by weight, unless otherwise notified.

EXAMPLE 1

Preparation of Trisazo Compound Represented by the Formula (2)

20.3 parts of 2-amino-5-methoxybenzenesulfonic acid was added to 500 parts of water and dissolved with sodium hydroxide, and the solution was cooled to 10° C. or lower, followed by adding 32 parts of 35% hydrochloric acid and then 6.9 parts of sodium nitrite, and stirring at 5-10° C. for 1 hour. Thereto was added 12.1 parts of 2,5-dimethylaniline dissolved in dilute aqueous hydrochloric acid, and pH was adjusted to 3 by adding sodium carbonate while stirring at 30-40° C., and coupling reaction was completed by further stirring and then the reaction product was filtered off to obtain a monoazo compound. To the resulting monoazo compound were added 32 parts of 35% hydrochloric acid and then 6.9 parts of sodium nitrite, followed by stirring at 25-30° C. for 2 hours. Thereto was added 12.1 parts of 2,5-dimethylaniline dissolved in dilute aqueous hydrochloric acid, and pH was adjusted to 3 by adding sodium carbonate while stirring at 20-30° C., and coupling reaction was completed by further stirring and then the reaction product was filtered off to obtain a disazo compound represented by the following formula (11).

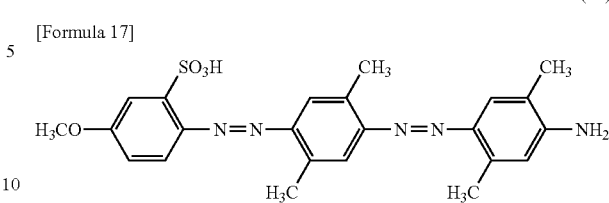

(11)

[Formula 17]

In 600 parts of water was dispersed 15 parts of the above disazo compound of the formula (11), and then thereto were added 32 parts of 35% hydrochloric acid and then 6.9 parts of sodium nitrite, followed by stirring at 25-30° C. for 2 hours to perform diazotization. Separately, 31.5 parts of 6-phenylamino-3-sulfonic acid-1-naphthol was added to 250 parts of water and dissolved by making weakly alkaline with sodium carbonate. In this solution was introduced the diazotized product of disazo compound obtained above with keeping the pH at 7-10, and the solution was stirred to complete the coupling reaction. Salting-out was carried out with sodium chloride and the precipitate was filtered to obtain the trisazo compound represented by the formula (2) as a sodium salt. This compound had red color and showed a maximum absorption wavelength of 568 nm in a 20% aqueous pyridine solution.

EXAMPLE 2

Preparation of Trisazo Compound Represented by the Formula (3)

A compound represented by the formula (3) was obtained as a sodium salt in the same manner as in Example 1, except that 2-methoxy-5-methylaniline was used in place of 2,5-dimethylaniline as the first coupler for the compound represented by the formula (11). The resulting compound had red color and showed a maximum absorption wavelength of 578 nm in a 20% aqueous pyridine solution.

EXAMPLE 3

Preparation of Trisazo Compound Represented by the Formula (5)

A trisazo compound represented by the formula (5) was obtained as a sodium salt in the same manner as in Example 1, except that 3,5-dimethylaniline was used in place of 2,5-dimethylaniline as the first coupler for the compound represented by the formula (11). The resulting compound had reddish purple color and showed a maximum absorption wavelength of 563 nm in a 20% aqueous pyridine solution.

EXAMPLE 4

Preparation of Trisazo Compound Represented by the Formula (7)

A trisazo compound represented by the formula (7) was obtained as a sodium salt in the same manner as in Example 1, except that 2-amino-4-methylbenzenesulfonic acid was used in place of 2-amino-4-methoxybenzenesulfonic acid as the starting material for the compound represented by the formula (11). The resulting compound had red color and showed a maximum absorption wavelength of 565 nm in a 20% aqueous pyridine solution.

EXAMPLE 5

Preparation of Trisazo Compound Represented by the Formula (8)

A trisazo compound represented by the formula (8) was obtained as a sodium salt in the same manner as in Example 1, except that 2-amino-4-sulfobenzoic acid was used in place of 2-amino-4-methoxybenzenesulfonic acid as the starting material for the compound represented by the formula (11). The resulting compound had red color and showed a maximum absorption wavelength of 568 nm in a 20% aqueous pyridine solution.

EXAMPLE 6

Preparation of Trisazo Compound Represented by the Formula (9)

A trisazo compound represented by the formula (9) was obtained as a sodium salt in the same manner as in Example 1, except that 2-amino-4-sulfobenzoic acid was used in place of 2-amino-4-methoxybenzenesulfonic acid as the starting material for the compound represented by the formula (11), and a diszao compound represented by the following formula (12) synthesized by using 3,5 dimethylaniline as the second coupler was used. The resulting compound had red color and showed a maximum absorption wavelength of 548 nm in a 20% aqueous pyridine solution.

[Formula 18]

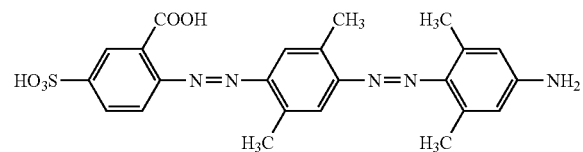

(12)

EXAMPLE 7

Preparation of Trisazo Compound Represented by the Formula (10)

20.3 parts of 3-amino-4-methoxybenzenesulfonic acid was added to 500 parts of water and dissolved with sodium hydroxide, and the solution was cooled to 10° C. or lower, followed by adding 32 parts of 35% hydrochloric acid and then 6.9 parts of sodium nitrite, and stirring at 5-10° C. for 1 hour. Thereto was added 15.3 parts of 2,5-dimethylaniline dissolved in dilute aqueous hydrochloric acid, and pH was adjusted to 3 by adding sodium carbonate while stirring at 30-40° C., and coupling reaction was completed by further stirring and then the reaction product was filtered off to obtain a monoazo compound. To the resulting monoazo compound were added 32 parts of 35% hydrochloric acid and then 6.9 parts of sodium nitrite, followed by stirring at 25-30° C. for 2 hours. Thereto was added 13.7 parts of 2-methoxy-5-methylaniline dissolved in dilute aqueous hydrochloric acid, and pH was adjusted to 3 by adding sodium carbonate while stirring at 20-30° C., and coupling reaction was completed by further stirring and then the reaction product was filtered off to obtain a disazo compound represented by the following formula (13).

[Formula 19]

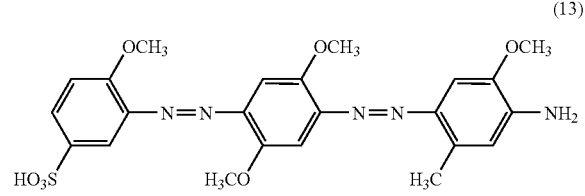

(13)

In 600 parts of water was dispersed 15 parts of the above disazo compound of the formula (13), and then thereto were added 32 parts of 35% hydrochloric acid and then 6.9 parts of sodium nitrite, followed by stirring at 25-30° C. for 2 hours to perform diazotization. Separately, 31.5 parts of 6-phenylamino-3-sulfonic acid-1-naphthol was added to 250 parts of water and dissolved by making weakly alkaline with sodium carbonate. In this solution was introduced the diazotized product of disazo compound obtained above with keeping the pH at 7-10, and the solution was stirred to complete the coupling reaction. Salting-out was carried out with sodium chloride and the precipitate was filtered to obtain the trisazo compound represented by the above formula (10) as a sodium salt. This compound had red color and showed a maximum absorption wavelength of 606 nm in a 20% aqueous pyridine solution.

EXAMPLE 8

A polyvinyl alcohol film of 75 μm in thickness was dipped in an aqueous solution containing 0.03% of the dye of the compound (2) obtained in Example 1 and 0.1% of Glauber's salt at 45° C. for 4 minutes. This film was stretched fivefold in a 3% aqueous boric acid solution at 50° C., and washed with water and dried with keeping the stretched state to obtain a polarizing film.

The resulting polarizing film had (a) a maximum absorption wavelength of 575 nm and (b) a degree of polarization of 99.9%. The light resistance (change in degree of polarization before and after irradiation with light) was 0.18%, which means that the light resistance was superior to that in the following Comparative Example 1 in long-term exposure. Furthermore, the polarizing film showed endurance over a long period of time even in the state of high temperature and high humidity. The test methods are explained below.

(a) Measurement of Maximum Absorption Wavelength (λmax) of Polarizing Film

Two pieces of the polarizing films obtained above were superposed one upon another so that the orientation directions crossed at right angles (crossed nicols state), and in this state the maximum absorption wavelength was measured using a spectrophotometer (U-4100 manufactured by Hitachi, Ltd.).

(b) Measurement of Degree of Polarization

Transmittance at parallel nicols state (Tp) and transmittance at crossed nicols state (Tc) were measured using the above spectrophotometer. The degree of polarization was calculated by the formula: degree of polarization=[(Tp−Tc)/(Tp+Tc)]1/2×100(%).

(c) Light Resistance (Change in Degree of Polarization Before and after Irradiation with Light)

The polarizing film was irradiated with light for 532 hours using an accelerated xenon arc fade meter (manufactured by Wacom Co.), and the degree of polarization after irradiation was obtained by the method described in the above (b), and the change in degree of polarization before and after irradiation was calculated by the formula: change in degree of polarization before and after irradiation=(degree of polarization before irradiation−degree of polarization after irradiation)/ degree of polarization before irradiation×100(%).

EXAMPLE 9

Polarizing films were obtained in the same manner as in Example 8, except that trisazo compounds of the formulas (3), (5) and (7)-(10) were used in place of the trisazo compound of the formula (2). The maximum absorption wavelength and degree of polarization of the resulting polarizing films are shown in Table 1. As shown in Table 1, the polarizing films prepared using these compounds had a high degree of polarization.

TABLE 1

| Sodium salt of trisazo compound | Degree of polarization of polarizing film prepared using trisazo compound | |
|---|---|---|
| | Maximum absorption wavelength (nm) of polarizing film | Degree of polarization |
| Compound of formula (2) | 578 | 99.9% |
| Compound of formula (3) | 585 | 99.9% |
| Compound of formula (5) | 570 | 99.9% |
| Compound of formula (7) | 575 | 99.9% |
| Compound of formula (8) | 570 | 99.9% |
| Compound of formula (9) | 560 | 99.9% |
| Compound of formula (10) | 620 | 99.9% |

EXAMPLE 10

Polarizing films were prepared in the same manner as in Example 8, except that trisazo compounds of the formulas (3), (7) and (8) were used in place of the trisazo compound of the formula (2). These polarizing films were irradiated with light for 532 hours using an accelerated xenon arc fade meter manufactured by Wacom Co., and change in degree of polarization before and after irradiation is shown in Table 2.

COMPARATIVE EXAMPLES 1-3

Polarizing films were prepared in the same manner as in Example 8, except that the compound of the following formula (14) described in Example 1 of Patent Document 2, a sodium salt of the compound of the following formula (15) described in Example 1 of Patent Document 6, and a sodium salt of the compound of the following formula (16) described in Example 1 of Patent Document 7 were used in place of the compound of Example 1. These polarizing films were irradiated with light for 532 hours using an accelerated xenon arc fade meter manufactured by Wacom Co., and change in degree of polarization before and after irradiation is shown in Table 2. As a result, the light resistances of these polarizing films after long-term exposure were inferior to those in Example 8 and Example 10.

[Formula 20]

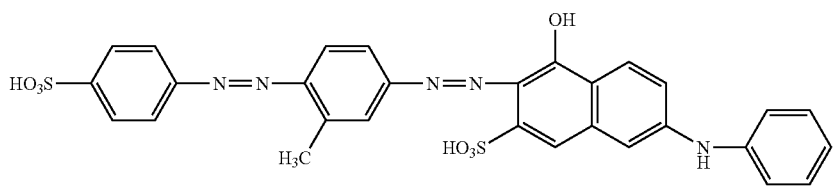

(14)

[Formula 21]

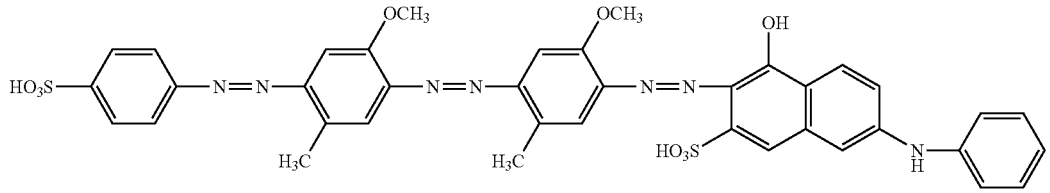

(15)

-continued

[Formula 22]

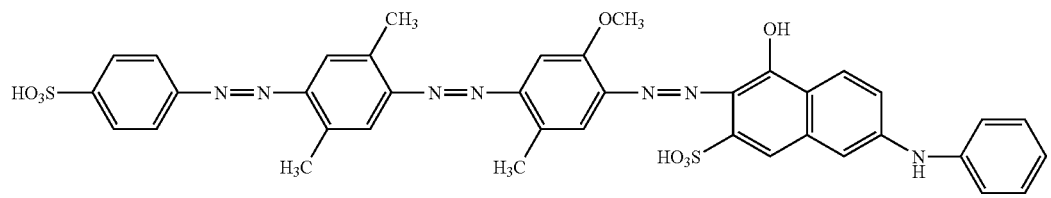

(16)

TABLE 2

Change in degree of polarization before
and after irradiation with light

| Sodium salt of trisazo compound | Change in degree of polarization |
| --- | --- |
| Example 1: Compound of formula (2) | 0.18% |
| Example 2: Compound of formula (3) | 0.30% |
| Example 4: Compound of formula (7) | 0.80% |
| Example 5: Compound of formula (8) | 0.68% |
| Comparative Example 1: Compound of formula (14) | 1.49% |
| Comparative Example 2: Compound of formula (15) | 1.95% |
| Comparative Example 3: Compound of formula (16) | 2.11% |

EXAMPLE 11

A polyvinyl alcohol film of 75 μm in thickness was dipped in an aqueous solution containing 0.04% of the trisazo compound of the formula (2) obtained in Example 1, 0.04% of C.I. Direct Red 81, 0.03% of C.I. Direct Orange 39, 0.03% of a dye represented by the following formula (17) described in Example 23 of Patent Document 8 and 0.1% of Glauber's salt at 45° C. for 4 minutes. This film was stretched fivefold in a 3% aqueous boric acid solution at 50° C., and washed with water and dried with keeping the stretched state to obtain a polarizing film of neutral color (grey at parallel nicols state and black at crossed nicols state). The resulting polarizing film had a single plate average light transmittance of 41% and an average light transmittance at crossed nicols state of 0.1% or lower, and had a high degree of polarization. Furthermore, it had endurance for a long period of time even in the state of high temperature and high humidity.

A polyvinyl alcohol film of 75 μm in thickness was dipped in an aqueous solution containing 0.05% of the trisazo compound of the formula (2) obtained in Example 1, 0.05% of C.I. Direct Orange 39, and 0.1% of Glauber's salt at 45° C. for 4 minutes. This film was stretched fivefold in a 3% aqueous boric acid solution at 50° C., and washed with water and dried with keeping the stretched state to obtain a polarizing film. A triacetylcellulose (TAC) film (thickness: 80 μm, trade name: TD-80U manufactured by Fuji Photo Film Co., Ltd.) was laminated on one surface of the resulting polarizing film with a polyvinyl alcohol (PVA) adhesive and a film comprising the TAC film and a UV (ultraviolet ray) curing hard coat layer of about 10 μm in thickness formed on another side of the TAC film was laminated on another surface of the resulting polarizing film with a polyvinyl alcohol (PVA) adhesive to obtain a polarizing plate of the present invention. An acrylate ester type adhesive was applied to one side of the polarizing plate to obtain a polarizing plate with adhesive layer, and furthermore the outer side of the hard coat layer was subjected to AR (anti-reflection) multi-coating by vacuum deposition. This polarizing plate was cut to a size of 30 mm×40 mm and laminated on a glass plate of the same size having a transparent AR layer on one side to obtain a polarizing plate with AR support (for green color channel of liquid crystal projector) of the present invention. The polarizing plate of this Example had a maximum absorption wavelength (λmax) of 552 nm, a single plate light transmittance of 42% in 500-580 nm, and an average light transmittance at crossed nicols state of 0.2% or lower, and had a high degree of polarization and showed endurance over a long period of time even in the state of high temperature and high humidity. Furthermore, it was also excellent in light resistance in long-term exposure.

INDUSTRIAL APPLICABILITY

[Formula 23]

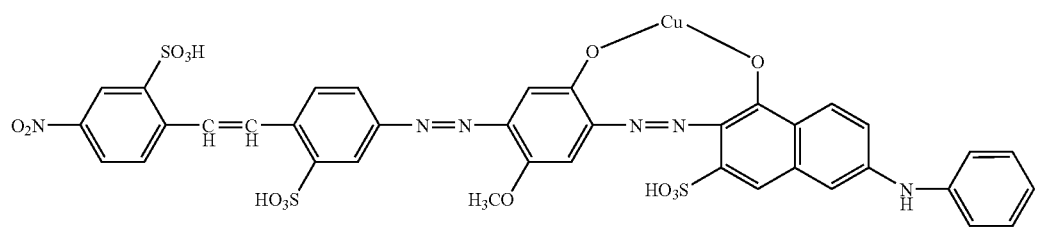

(17)

EXAMPLE 12

The azo compound of the present invention or a salt thereof is useful as a dye for polarizing films. The polarizing films or polarizing plates containing this compound have a high polarizing performance comparable to that of polarizing films which use iodine, and are excellent also in endurance, and hence are suitable for uses in various liquid crystal display devices and liquid crystal projectors, uses in vehicles which need high polarizing performance and endurance, and display uses of industrial instruments used in various environments.

The invention claimed is:

1. An azo compound represented by the following formula (1) in the form of a free acid:

[Formula 1]

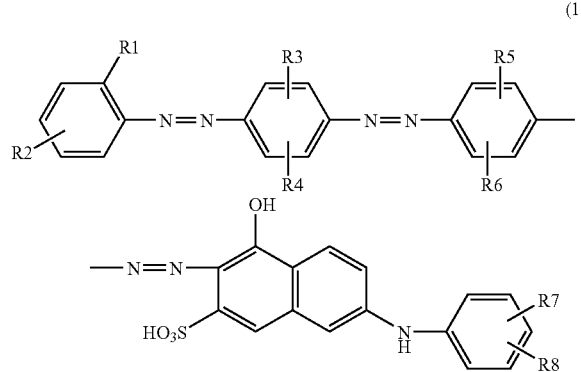

(1)

[in the above formula, R1 represents a sulfo group, a carboxyl group or a lower alkoxyl group, R2 represents a sulfo group, a carboxyl group, a lower alkyl group or a lower alkoxyl group, with the proviso that a case where both R1 and R2 represent sulfo group is excepted, R3 to R6 each independently represents a hydrogen atom, a lower alkyl group or a lower alkoxyl group, and R7 and R8 each independently represents a hydrogen atom, an amino group, a hydroxyl group, a sulfo group or a carboxyl group].

2. An azo compound according to claim 1, wherein R1 is a sulfo group and R2 is a lower alkyl group or a lower alkoxyl group.

3. An azo compound according to claim 1, wherein R1 is a carboxyl group or a lower alkoxyl group and R2 is a sulfo group or a carboxyl group.

4. A dye-type polarizing film or polarizing plate containing the azo compound of any one of claims 1-3 or a salt thereof in a substrate of the polarizing film.

5. A dye-type polarizing film or polarizing plate containing the azo compound of any one of claims 1-3 or a salt thereof and one or more of other organic dyes in a substrate of the polarizing film.

6. A dye-type polarizing film or polarizing plate according to claim 4, wherein the substrate of the polarizing film is a film comprising a polyvinyl alcohol resin.

7. A dye-type polarizing film or polarizing plate according to claim 4 which is used for liquid crystal projectors.

8. A dye-type polarizing film or polarizing plate according to claim 5, wherein the substrate of the polarizing film is a film comprising a polyvinyl alcohol resin.

9. A dye-type polarizing film or polarizing plate according to claim 5 which is used for liquid crystal projectors.

10. A dye-type polarizing film or polarizing plate according to claim 6 which is used for liquid crystal projectors.

11. A dye-type polarizing film or polarizing plate according to claim 8 which is used for liquid crystal projectors.

* * * * *